(12) United States Patent
Singer et al.

(10) Patent No.: US 10,877,131 B2
(45) Date of Patent: *Dec. 29, 2020

(54) DISTRIBUTED VEHICLE LIDAR SYSTEM

(71) Applicant: GM GLOBAL TECHNOLOGY OPERATIONS LLC, Detroit, MI (US)

(72) Inventors: Scott Singer, San Gabriel, CA (US); Lutfollah Maleki, Pasadena, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/729,396

(22) Filed: Dec. 29, 2019

(65) Prior Publication Data

US 2020/0132814 A1 Apr. 30, 2020

Related U.S. Application Data

(63) Continuation of application No. 16/236,572, filed on Dec. 30, 2018, now Pat. No. 10,605,899, which is a
(Continued)

(51) Int. Cl.
*G01C 3/08* (2006.01)
*G01S 7/481* (2006.01)
(Continued)

(52) U.S. Cl.
CPC .......... *G01S 7/4813* (2013.01); *G01S 7/4818* (2013.01); *G01S 7/4865* (2013.01); *G01S 17/26* (2020.01);
(Continued)

(58) Field of Classification Search
CPC ........ G01S 17/931; G01S 17/34; G01S 17/26; G01S 17/87; G01S 17/50; G01S 7/4813; G01S 7/4818; G01S 7/4865
(Continued)

(56) References Cited

U.S. PATENT DOCUMENTS 4,721,385 A 1/1988 Jelalian et al.
5,291,261 A 3/1994 Dahl et al.
(Continued)

FOREIGN PATENT DOCUMENTS

CA 2842814 A1 8/2014

OTHER PUBLICATIONS

"Supplementary European Search Report for European Patent Application No. 17/835,379.3", dated Jul. 5, 2019, 6 pages.
(Continued)

*Primary Examiner* — Mark Hellner
(74) *Attorney, Agent, or Firm* — Medley, Behrens & Lewis, LLC

(57) ABSTRACT

A distributed FM LiDAR system that provides a central unit that includes a frequency modulated optical signal source and a central receiver for reflected light, along with multiple optical heads that include only optical components is described. No optical delay lines or timing compensation photonic or electronic circuitry is necessary between the central unit and the optical heads. The relatively simple optical heads do not require extensive protection from shock or vibration, and can be distributed between a vehicle and a towed trailer or similar vehicle, with connections being provided by an optical coupling.

20 Claims, 4 Drawing Sheets

Related U.S. Application Data continuation of application No. 15/663,506, filed on Jul. 28, 2017, now Pat. No. 10,598,770.

(60) Provisional application No. 62/367,815, filed on Jul. 28, 2016.

(51) Int. Cl.
*G01S 7/4865* (2020.01)
*G01S 17/87* (2020.01)
*G01S 17/50* (2006.01)
*G01S 17/26* (2020.01)
*G01S 17/34* (2020.01)
*G01S 17/931* (2020.01)

(52) U.S. Cl.
CPC .............. *G01S 17/34* (2020.01); *G01S 17/50* (2013.01); *G01S 17/87* (2013.01); *G01S 17/931* (2020.01)

(58) Field of Classification Search
USPC ........................................................ 356/5.01
See application file for complete search history.

(56) References Cited

U.S. PATENT DOCUMENTS

| | | | |
|---|---|---|---|
| 5,665,063 A | 9/1997 | Roth et al. | |
| 6,665,063 B2* | 12/2003 | Jamieson | G01C 23/005 356/141.1 |
| 9,297,899 B2 | 3/2016 | Newman et al. | |
| 2003/0043058 A1 | 3/2003 | Jamieson et al. | |
| 2011/0285980 A1 | 11/2011 | Newbury et al. | |
| 2012/0286136 A1 | 11/2012 | Krill et al. | |
| 2014/0233013 A1* | 8/2014 | Sakimura | G01S 7/4818 356/5.01 |
| 2016/0161600 A1 | 6/2016 | Eldada et al. | |
| 2017/0153319 A1 | 6/2017 | Villeneuve et al. | |
| 2017/0361844 A1 | 12/2017 | Kahn et al. | |
| 2018/0105107 A1 | 4/2018 | Hassan-Shafique et al. | |
| 2018/0364356 A1* | 12/2018 | Eichenholz | H01S 5/4087 |
| 2019/0025412 A1* | 1/2019 | O'Keeffe | G01S 17/10 |

OTHER PUBLICATIONS

"PCT International Search Report and Written Opinion for PCT/US2017/044501", dated Dec. 6, 2017, 13 pages.

"Non-Final Office Action for U.S. Appl. No. 16/236,572", dated Dec. 18, 2019, 6 Pages.

"Reply to the Non-Final Office Action for U.S. Appl. No. 16/236,572", filed Dec. 19, 2019, 10 Pages.

"Non-Final Office Action for U.S. Appl. No. 15/663,506", dated Sep. 13, 2019, 6 Pages.

"Reply to the Non-Final Office Action for U.S. Appl. No. 15/663,506", filed Dec. 13, 2019, 8 Pages.

* cited by examiner

DISTRIBUTED VEHICLE LIDAR SYSTEM

RELATED APPLICATIONS

This application is a continuation of U.S. patent application Ser. No. 16/236,572, filed Dec. 30, 2018, and entitled "DISTRIBUTED VEHICLE LIDAR SYSTEM", which is a continuation of U.S. patent application Ser. No. 15/663,506, filed Jul. 28, 2017, and entitled "DISTRIBUTED VEHICLE LIDAR SYSTEM", which claims the benefit of U.S. Provisional Application No. 62/367,815, filed on Jul. 28, 2016, and entitled "DISTRIBUTED LIDAR SYSTEM". The entireties of these applications are incorporated herein by reference.

FIELD OF THE INVENTION

The field of the invention is LiDAR systems, particularly frequency modulated continuous wave LiDAR systems for use in vehicles.

BACKGROUND

The following description includes information that may be useful in understanding the present invention. It is not an admission that any of the information provided herein is prior art or relevant to the presently claimed invention, or that any publication specifically or implicitly referenced is prior art.

LiDAR's are becoming important in sensing applications in a variety of fields associate with autonomous navigation. In particular, autonomous vehicles, UAV's and robotics rely on LiDAR to produce imaging information to be used, with or without information from other sensors, to guide the motion of those platforms. Currently, LiDAR systems consisting of an instrument head (where the light source, the light detectors, the transmission/steering optics, and the detection optics are located) and control and processing assemblies used for the kind of applications made above are housed in a single housing, which is then connected to cables and wires for power and data transmission to a computer or similar capability for image analysis. This implies that the entire package must be placed on the platform, at a location with access to the area for which the imaging is required. For example, for applications with advanced driver assisted systems (ADAS), the LiDAR must be placed on top of the car, or in other locations (say, under the front grill) to have access to the road and roadside. This could be difficult to implement, if the desire is to keep the package from interfering with the structure of the body of the car. This is further complicated if the package must be incorporated with active/passive isolation assemblies to reduce the undesirable effects of shock and vibration that interfere with the proper operation of the LiDAR, or reduce its performance.

LiDAR can be accomplished in a variety of ways. In "time of flight" (TOF) LiDAR short pulses of light are emitted and reflected pulses received, with the delay between emission and reception providing a measure of distance between the emitter and the reflecting object. Such TOF systems, however, have a number of disadvantages. For example simple TOF measurements, in relying solely on the intensity of received light, are highly susceptible to interference from extraneous and irrelevant signal sources. This issue becomes more pronounced as the distance between the emitter and the reflecting object increases, as such distance necessarily decreases the strength of the reflected signal. On the other hand, inherent limitations in accurately measuring extremely short time intervals limit the spatial resolution of such TOF LiDAR systems at close range. In addition, the range of such TOF LiDARs is a function of the ability to detect the relatively faint reflected signal. The resulting range limitations are frequently addressed by using highly sensitive photodetectors. In some instances such detectors can detect single photons. Unfortunately this high degree of sensitivity also leads to increased misidentification of interfering signals as reflect TOF LiDAR pulses from objects other than the target or from other light sources. Despite these disadvantages TOF LiDAR systems currently find wide application, primarily due to the ability to provide such systems in a very compact format and the ability to utilize relatively inexpensive non-coherent laser light sources.

One approach to resolving this problem is to provide a ToF LiDAR system in which system components are distributed about the vehicle. An example of such an approach is found in United States Patent Application No. 2017/0153319 (to Villeneuve and Eichenholz). All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. In such an approach some components of a ToF LiDAR system (such as transmitting scanner, input for gathering reflected light, and a receiver for characterizing the reflected light) can be positioned as a unit at one location of a vehicle while another component (such as the light source) can be positioned elsewhere. The distributed components can be connected using conventional fiber optics and electrical cabling. The time-dependent nature of TOF LiDAR, however, requires proximity of the transmitting scanner, input, and receiver in order to retain timing fidelity. As a result the scanning/receiving assembly of such systems remains relatively large and complex.

Alternatives to TOF LiDAR have been developed. One of these, frequency modulated (FM) LiDAR, relies on a coherent laser source to generate repeated waveforms representing a change of frequency with time or "chirps" of time delimited, frequency modulated optical energy. The frequency within waveform or chirp varies over time, and measurement of the phase and frequency of an echoing waveform or chirp relative to a reference signal provides a measure of distance and velocity of the reflecting object relative to the emitter. Other properties of the reflected chirp (for example, intensity) can be related to color, surface texture, or composition of the reflecting surface. In addition, such FM LiDARs are relatively immune to interfering light sources (which tend to produce non-modulated signals that are not coherent with the received signal) and do not require the use of highly sensitive photodetectors.

Unfortunately, FM LiDAR systems that have been developed to date are generally not compact, as they rely on relatively large FMCW laser sources. In addition, such systems typically rely on a carefully modulated, low noise local oscillator (for example, a narrow linewidth solid state, gas, or fiber laser) with frequency modulation corresponding to that of the emitted chirp provided by a relatively large interferometer. This local oscillator precisely replicates an emitted waveform or chirp, and serves as the reference for the received reflected signal. As a result FM LiDARs are typically large, complex, and expensive, and have seen limited implementation relative to TOF LiDARs despite their performance advantages.

Thus, there is still a need for effective and economical LiDAR systems that provide thorough coverage of the area surrounding a motor vehicle.

SUMMARY

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1A schematically depicts such a system with separate waveguides for outgoing and incoming frequency modulated light signals. FIG. 1B schematically depicts such a system that utilizes a common waveguide for outgoing and incoming frequency modulated light signals.

FIG. 2A schematically depicts a system in which an optical router is utilized to distribute incoming and/or outgoing FM modulated optical chirps or pulses and is separate from a centralized signal and control unit. FIG. 2B schematically depicts a system in which an optical router is utilized to distribute incoming and/or outgoing FM modulated optical chirps or pulses and is positioned within a centralized signal and control unit.

DETAILED DESCRIPTION

Figure 1A:
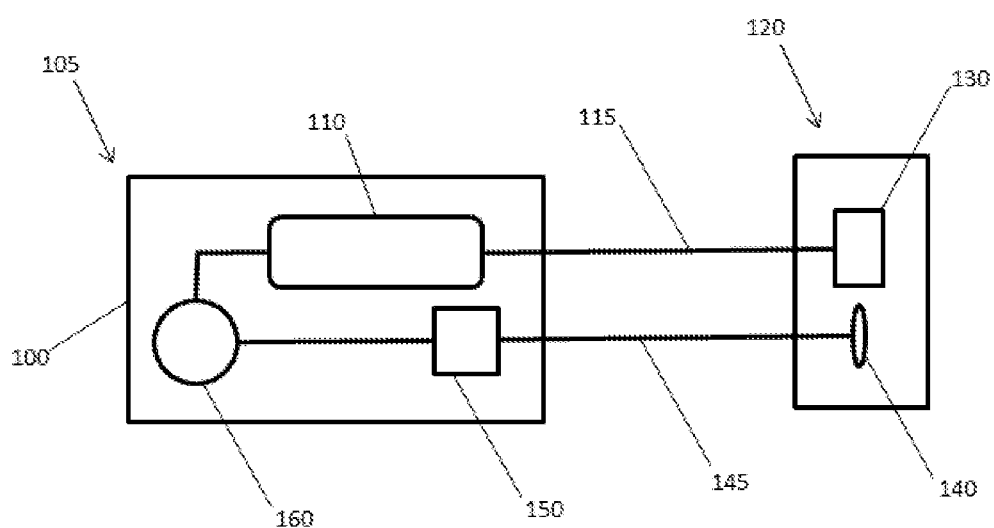
FIGS. 1A and 1B schematically depict a distributed FM LiDAR system of the inventive concept. System components are separated into a compact, lightweight optical head 120 including optical components and a signal and processing unit 105 that includes a frequency modulated pulse or chirp source and a receiver.

The inventive subject matter provides apparatus, systems and methods in which a components of an FM LiDAR system are distributed in different locations around a vehicle, and interconnected with optical fiber without a need for the inclusion of optical delay lines or similar features. For example, a compact and relatively simple optical head that includes a scanner and an input for reflected signals can be placed at a distance from a receiver for the reflected signals, the source laser, and other components of an FM LiDAR. The distributed components can be connected by optical fibers, and do not require electrical communication. In addition, the relatively small and lightweight optical head can be conveniently placed in a wide variety of locations, and the reduced size and weight simplify shock and vibration control. In some embodiments two or more optical heads are distributed around a vehicle or trailer, and are connected with other components of an FM LiDAR system (for example, a receiver for reflected signals, laser light source, etc.) using optical fibers and a routing device for optical signals.

One should appreciate that the devices and systems described herein provide distributed FM LiDAR systems that permit accurate identification of objects, obstacles and vehicles using lightweight and robust components suitable for placement in a wide variety of locations on or in a vehicle.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

FM LiDAR systems of the inventive concept can include a frequency-modulated light source (such as an FM laser or FM laser optical subsystem), an optical head that includes an optical scanning device for transmitting frequency modulated laser waveforms or chirps to the environment and also includes an input for capturing reflected pulses or chirps, and a receiver for receiving captured waveforms or chirps and converting the captured waveforms or chirps into electrical signals. Such a system can also include a controller that receives such electrical signals and derives information related to the distance of reflecting objects. Such a controller can also be coupled to the optical scanner, and provide instructions for rate and direction of the scanning stream of optical pulses or chirps. Similarly, the controller can be coupled to the frequency-modulated laser light source, and provide instructions for repeat rate, frequency ramp duration, frequency ramp configuration, and/or other properties of waveforms, modulations, or chirps to be transmitted.

Any suitable frequency-modulated light source can be utilized to produce frequency modulated pulses or chirps for transmission by systems and devices of the inventive concept. In some embodiments optical waveforms or chirps can be generated by applying a modulated bias current to a wavelength-tunable laser diode in order to shift the instant frequency of the emitted light. In other embodiments the output of a laser light source can be directed through an electro-optic or acousto-optical modulator to provide the necessary frequency shift. In such an embodiment a portion of the laser light can be directed through a modulator to provide a local oscillator signal.

In some embodiments devices and systems of the inventive concept can incorporate a laser source that is optically coupled to a whispering gallery mode optical resonator as a frequency modulated light source. Light from the laser is coupled into a whispering gallery mode optical resonator, and is coupled back out as a returning counterpropagating wave having a frequency characteristic of a whispering gallery mode of the optical resonator. This returning wave can reduce the linewidth of the source laser by optical injection. Frequency modulated waveforms or chirps can be produced by modulating an optical property of the whispering gallery mode optical resonator, which in turn results in modulation of the frequency supported by whispering gallery modes of the resonator. Light with such modulated frequencies can be used to provide frequency modulated waveform or chirps from robust and low-cost laser light sources, for example a semiconductor laser.

One embodiment of the inventive concept is a LiDAR system that includes a laser light source, a modulatable whispering gallery mode resonator that is optically coupled to the laser light source to provide linewidth reduction via optical injection (or, alternatively, electronic locking), a transducer that can alter an optical property of the whispering gallery mode optical resonator (for example, refractive index), a controller that controls the transducer, a transmission assembly for transmitting optical chirps generated by the controller, a receiver that receives reflected optical frequency modulated waveforms or chirps, and a processor that utilizes data derived from the reflected frequency modulated waveforms or chirps to determine position of an object that is reflecting the chirps. In some embodiments all of these components are provided on a single substrate. The linewidth of the locked laser source can be less than 1 kHz. In such an embodiment the laser source can also act as the source of a reference waveform, modulation, or chirp that is combined with a reflected waveform, modulation, or chirp in determining position of a reflecting object.

In embodiments of the inventive concept the FM laser and the receiver are housed separately from an optical head that includes an optical scanner (utilized to direct the frequency modulated light into the environment) and an optical input (utilized to receive reflected light from the environment). As shown in FIG. 1A, the FM laser can be part of an FM modulation, waveform, or chirp source 110, which can be housed with a receiver 150 (which serves to convert received reflected light into electrical impulses) and a controller 160. In a preferred embodiment these components can be housed in a common signal processing unit (105) in common enclosure or housing 100, which can be positioned at a central or convenient position within the vehicle. Such a housing or enclosure 100 can be attached or otherwise coupled to a vibration and/or shock reducing mounting in order to reduce or eliminate damage to these relatively sensitive components.

Figure 1B:
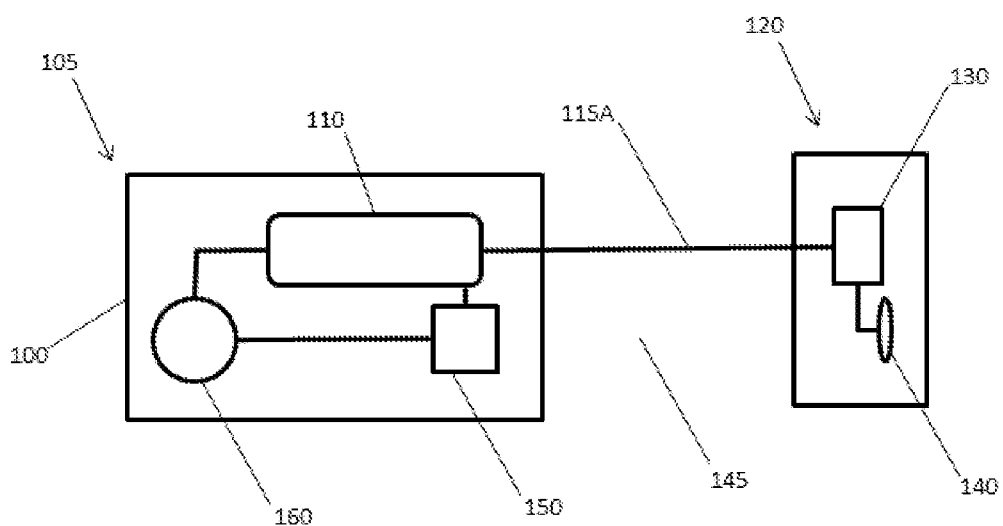

As shown, components of such a signal and processing unit can be in optical communication with an optical head 120. Optical communication can be provided by waveguides (115, 145), such as optical fibers. For example, an outgoing optical waveguide 115 can provide optical communication between the FM chirp source 110 and a scanner/emitter 130 of an optical head. Similarly, an incoming optical waveguide 145 can direct reflected light collected by an optical input 140 of an optical head 120 to a receiver 150 of the signal and processing unit 105. Although use of separate incoming and outgoing optical waveguides is shown in FIG. 1A, in some embodiments a common waveguide 115A can be used for outgoing frequency modulated waveforms or chirps and incoming light (which can include reflected frequency modulated waveforms or chirps), as shown in FIG. 1B. In some embodiments differentiation between outgoing frequency modulated waveforms or chirps and incoming frequency modulated waveforms or chirps can, if necessary, be provided by an optical switch or router and/or by tracking the timing of the frequency modulated waveforms or chirps. Such an optical switch or router can be located within the housing 100 or outside of the housing.

It should be appreciated that the optical head 120 can include only optical components and related manipulators. For example, an optical head can include an optical scanner 130 (for example, an X/Y scanner) and an optical input 140 for reflected pulses or chirps. An optical scanner can include one or more reflective surfaces coupled to mechanisms that control their orientation (such as motors and/or piezoelectric devices), which permits scanning of a stream of pulses or chirps received by the optical scanner from a frequency-modulated light source (for example, via an optical fiber). A variety of mechanisms are suitable for providing the scanning function, including rotating or gimbal-mounted mirrors, MEMs devices, a set of two or more mirrors mounted on actuators (for example, electric motors, solenoids, and or piezoelectric devices) in a mutually orthogonal fashion, rotating prisms, and/or rotating lenses. An example of a suitable MEMs device is the solid-state tripod mirror mount developed by MinFaros®. In some embodiments a phased array steering device can be used to provide a scanning function. Such a scanning function can be utilized to direct a series of transmitted pulses or chirps in a pattern that sweeps an X-Y plane and/or interrogates a three dimensional volume.

An optical input 140 can include a device for gathering light that is positioned to direct incoming, reflected light to an incoming waveguide 145 that is optically coupled to a receiver 150, which can be located at a distance from the optical head. For example, a lens or mirror can be positioned behind an optically transparent window of an optical head 120. An input facet of a waveguide serving as an incoming optical fiber 145 can be positioned at or near a focal point of the lens or mirror.

In some embodiments the position from which the emitted modulation, waveform, or chirp, or otherwise modulated light leaves the optical head and the position from which the reflected modulation, waveform, or chirp encounters the optical input are coaxial. In other embodiments the position from which the emitted modulation, waveform, or chirp, or otherwise modulated light leaves the optical head and the position from which the reflected modulation, waveform, or chirp, or otherwise modulated light encounter the optical input are positioned on different optical axes. In a preferred embodiment the position from which the emitted modulation, waveform, or chirp, or otherwise modulated light leaves the LiDAR system and the position from which the reflected modulation, waveform, or chirp, or otherwise modulated light encounters the optical input are coaxial and proximal, so as to provide a compact device. In some embodiments the optical scanner and the optical input are fabricated on a common surface, such as on a silicon chip or wafer, to provide an essentially unitary and/or solid-state device.

Since both the optical scanner and the optical input are simple and compact the optical head can be relatively small and lightweight. This permits installation of an optical head of the inventive concept in a wide variety of locations on a vehicle, for example behind a front grill, within a door or roof panel, inside of a bumper assembly, etc. The relatively small size and light weight also simplifies vibration and shock proofing. It should also be appreciated, particularly in view of the relatively exposed positions of such system components, that the relative simplicity of the optical head simplifies and reduces the expense of repair and replacement.

Figure 2A:
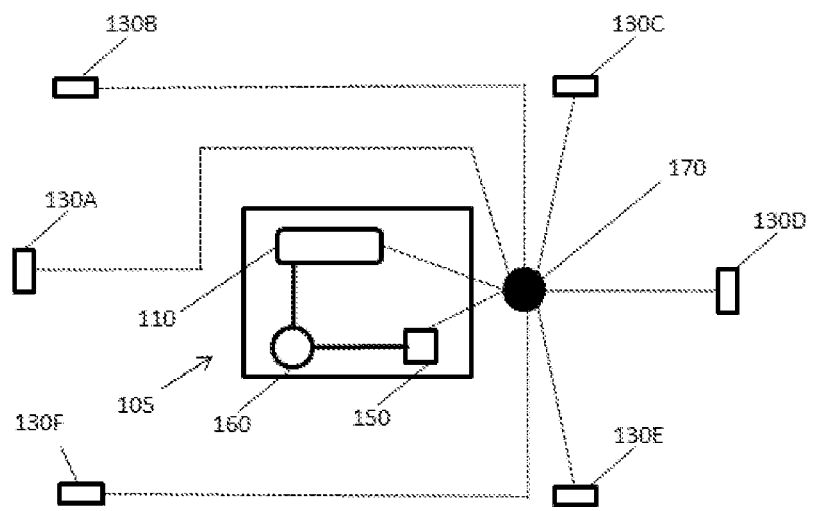
FIGS. 2A and 2B schematically depicts a distributed FM LiDAR system of the inventive concept, incorporating multiple optical heads in optical communication with a central signal and processing unit.
Figure 2B:
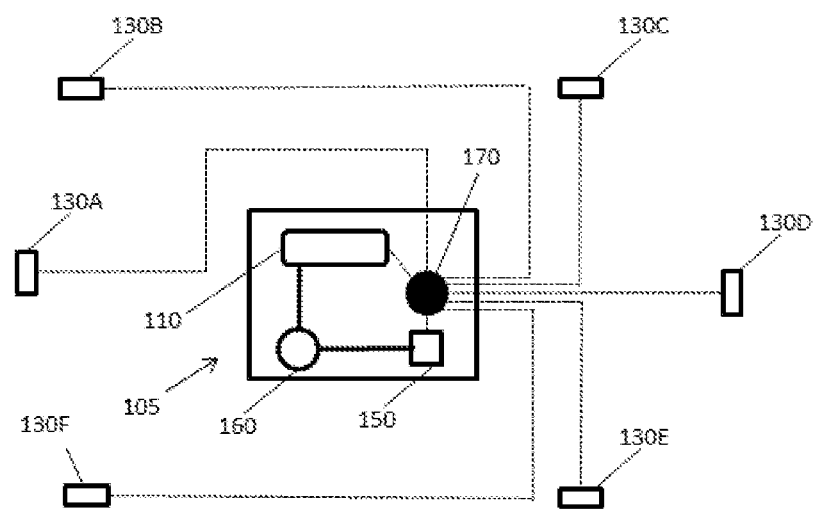

In a preferred embodiment a single signal and processing unit 105 is optically coupled to two or more optical heads (130A to 130F) using optical waveguides, as shown in FIGS. 2A and 2B. Such optical heads can be arranged about the exterior of a vehicle to provide a distributed LiDAR system. The number and position of such optical heads can be selected to provide an overlap of the observed field available to each optical head, thereby providing complete LiDAR coverage around the vehicle. It should be appreciated that it is not necessary to incorporate optical delay lines or similar devices into the optical waveguides in order to correct for differences in time of flight between optical chirps or pulses. Similarly, it is not necessary to calibrate the system or apply a corrective algorithm in order to correct for differences in time of flight between transmitted and received light and signals. In some embodiments each optical head can be connected directly to the signal and processing unit, which can include an optical router or similar device that permits switching of incoming reflected light from individual optical heads to a common receiver. In other embodiments individual optical heads can be connected to an optical switch, optical router or similar device 170, which can direct frequency modulated modulation, waveform, or chirp, or otherwise modulated light from the FM modulation, waveform, or chirp, or otherwise modulated light source 110 to one or more optical head(s) 130 via outgoing optical fibers or waveguides and/or direct light from reflected frequency modulated modulation, waveform, or chirp, or otherwise modulated light from one or more optical head(s) 130 to a receiver 150 via incoming optical fibers or waveguides. In some embodiments, as shown in FIG. 2A, the optical router 170 is located separately from the signal and processing unit 105. In other embodiments, as shown in FIG. 2B, the optical router 170 is located within the signal and processing unit 105.

The controller 160 can provide control of the frequency modulated FM modulation, waveform, or chirp, or otherwise modulated light source, for example providing a frequency modulated electrical signal utilized to generate the desired FM modulation, waveform, or chirp. In some embodiments the controller can also receive electrical signals from the receiver 150, which correspond to reflected light from the environment. In such embodiments the controller can include a processor and/or algorithm that utilizes information content of the received electrical signals to derive position data for a reflecting object within range of an optical head. The controller can include one or more processing modules, which can incorporate one or more microprocessors. Examples of suitable microprocessors include members of the SnapDragon® chips from QualComm®. For example, a controller can include a fast Fourier transform module for initial processing of combined data from reflected chirps received from the environment and a reference, non-reflected chirp. The transformed data from such a fast Fourier transform module can then be used to derive spatial coordinates and/or velocity of a reflective surface that provided the reflected light. The controller 160 can store and/or transmit such data derived from one or more reflected FM modulation, waveform, or chirp, or otherwise modulated light in the form of a point cloud (i.e. a collection of data points representing spatial coordinates of reflecting surfaces). Such a point cloud can also encode information related to velocity and/or secondary information (such as color, texture, roughness, composition, etc.).

In some embodiments, an FM LiDAR of the inventive concept is integrated into a vehicle assistance system. In such an embodiment the FM LiDAR can be integrated into or mounted on (or in) a mobile vehicle (for example, a ground vehicle, an aircraft, a drone, and/or a watercraft). For example, a signal and processing unit 105 can be positioned at a location that provides sufficient space for the signal and processing unit and requisite shock and vibration resistant mounting, while multiple optical heads can be distributed in appropriate positions around the exterior (or at least with optical access to the exterior) of a vehicle. In such an embodiment the FM LiDAR can provide spatial data related to position and/or velocity of reflecting objects within the scanning range of the FM LiDAR system. Such a scanning range can represent a plane and/or a volume, depending upon the configuration of the FM LiDAR system. Such data can be represented as a point cloud, wherein each point represents at least 2D or 3D spatial coordinates related to a reflecting object. In some embodiments characteristics of the reflected light (for example, amplitude and/or intensity) can provide information related to additional characteristics of the reflecting object (for example, composition, color, surface texture, etc.). Values for such additional characteristics can be encoded in the points of the point cloud.

Such point cloud data can be utilized by on-board or off-board processors to provide assistance to the operation of vehicles so equipped. In some embodiments such assistance can be in the form of warnings and/or prompts that are provided to a vehicle operator. Such a vehicle operator can be present in the vehicle or can be piloting the vehicle remotely. In some embodiments assistance to a vehicle operator can be provided in the form of automated vehicle responses. Examples of automated vehicle responses include changes in speed (e.g. accelerating, decelerating, braking, etc.), altitude, and/or direction. Such automated vehicle responses can be provided following prompting of the vehicle operator or in an autonomous fashion. In some embodiments such automated vehicle responses can override control of the vehicle provided by the vehicle operator, for example when detected conditions meet certain criteria. Examples of such criteria include determination that a detected condition can result in injury to an operator and/or a detected individual, vehicle damage or loss, or require action that is more rapid than can be provided by the operator.

In other embodiments of the inventive concept such point cloud data can be utilized by on-board or off-board processors to provide a vehicle so equipped with the capability to operate autonomously. In some embodiments such an autonomous functionality can be at the discretion of an onboard or remote vehicle operator. In such embodiments the vehicle can be directed by the vehicle operator during part of its operation (for example, take off, landing, heavy pedestrian traffic, etc.) and operate autonomously under other conditions. In other embodiments a vehicle so equipped operates wholly autonomously. Such an autonomous vehicle can be configured to carry passengers (i.e. persons not involved in operating the vehicle), or can be designed to operate without a human presence.

In some embodiments of the inventive concept, a distributed LiDAR system that includes a single signal and processing unit (incorporating a FM modulation, waveform, or chirp, or otherwise modulated light source, a receiver for transforming reflected light into an electronic impulse, a controller, and, optionally, an optical switch or router) and multiple optical heads (incorporating an optical scanner and an optical input for reflected light) that are connected by optical waveguides can be incorporated into a motor vehicle. In some embodiments the components of such a distributed LiDAR system are distributed about a discrete vehicle (such as an automobile, watercraft, or aircraft), with shock and vibration protection provided for the signal and processing unit. In other embodiments the components of such a distributed LiDAR system are distributed between a primary vehicle (which can include a driver and/or an autonomous driving system) and a coupled secondary vehicle that is passively directed and/or towed by the primary vehicle. Such a secondary vehicle can include an engine or motor that provides motive force for the secondary vehicle, or can lack an engine or motor such that motive force is provided by the primary vehicle. In some embodiments the secondary vehicle can include steering and/or braking mechanisms that are directed by the primary vehicle. For example, the signal and processing unit (and, optionally, one or more optical head(s)) can be installed in or on a cab portion of a commercial transport truck that provides motive power and primary steering, and one or more optical head(s) can be installed in or on one or more trailer(s) that is(are) coupled to and pulled by the cab and that provides braking for the trailer(s) that is(are) under the direction of the cab, with connections between these components provided by optical fibers or waveguides. In such embodiments an optical connector can be provided between the primary vehicle and the secondary vehicle that provides an optical link between one or more optical fibers or waveguide(s) associated with one or more optical head(s) mounted in or on the secondary vehicle and one or more waveguide(s) associated with the signal and processing unit located on or in the primary vehicle.

In some embodiments of the inventive concept a distributed FM LiDAR of the inventive concept can be incorporated into an Advanced Driver Assistance System (ADAS). Such systems provide automated/adaptive and/or enhanced vehicle systems that improve safety while driving. Such systems are designed to avoid collisions and accidents, by utilizing technologies that alert a driver to potential problems, or to avoid collisions by assuming control of the vehicle. ADAS can provide adaptive features such as automated lighting, adaptive cruise control, and automated braking, and can incorporate GPS/traffic warnings, connect with a smartphone and/or a data cloud. Such systems can alert a driver to the presence and/or proximity of other vehicles or obstacles, keep the vehicle in a desired traffic lane, and/or provide a driver with a display of what is not visible via the vehicle's mirrors.

In other embodiments an ADAS system incorporating a distributed FM-LiDAR of the inventive concept can provide instructions to systems that direct the movement of the vehicle. For example, such an ADAS system can provide instructions that trigger an actuator that manipulates components of the vehicle's brake system, steering system, and/or engine accelerator. In such an embodiment the system can augment a vehicle operator's actions or, alternatively, permit the vehicle to operate in an autonomous or semi-autonomous fashion. In other embodiments such a ADAS system can provide instructions to a vehicle system that is, at least in part, operating the vehicle. For example, such an ADAS engine can provide instructions to a cruise control system, which in turn provides instructions to actuators coupled to various vehicle operating components. Alternatively, an ADAS system of the inventive concept can provide instructions to an autonomous driving system that operates the vehicle without the need for direct action by a vehicle operator.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A distributed lidar system, comprising:
   a signal processing unit in a housing, the signal processing unit comprising:
      a frequency modulated light source in the housing, the frequency modulated light source configured to provide a frequency modulated waveform; and
      a receiver in the housing, the receiver configured to transform a reflected frequency modulated waveform into an electrical signal; and
   a first optical head separate from the housing, the first optical head comprising:
      a first optical scanner in optical communication with the frequency modulated light source, the first optical scanner configured to transmit the frequency modulated waveform into an environment; and
      a first optical input in optical communication with the receiver, the optical input configured to receive the reflected frequency modulated waveform from the environment;
   a second optical head separate from the housing, the second optical head comprising:
      a second optic scanner in optical communication do with the frequency modulated light source; and
      a second optical input in optical communication with the receiver;
   at least one waveguide that provides optical communication between the signal processing unit and the first optical head; and
   at least one differing waveguide that provides optical communication between the signal processing unit and the second optical head.

2. The distributed lidar system of claim 1, the frequency modulated light source comprising a laser source optically coupled to a whispering gallery mode optical resonator.

3. The distributed lidar system of claim 1, the signal processing unit further comprising:
   a controller in the housing, the controller configured to derive information indicative of a distance to an object in the environment based on the electrical signal.

4. The distributed lidar system of claim 1, the signal processing unit further comprising:
   a controller in the housing, the controller configured to provide a frequency modulated electrical signal, the frequency modulated electrical signal causes the frequency modulated light source to generate the frequency modulated waveform.

5. The distributed lidar system of claim 1, wherein the housing of the signal processing unit is coupled to a shock and vibration resistant mounting.

6. The distributed lidar system of claim 1, the signal processing unit further comprising:
   an optical router in the housing, the optical router configured to switch between the first optical input and the second optical input.

7. The distributed lidar system of claim 1, further comprising:
   an optical router separate from the housing, the optical router configured to switch between the first optical input and the second optical input.

8. The distributed lidar system of claim 1, the at least one waveguide comprising:
   a first waveguide that provides optical communication between the frequency modulated light source in the housing and the first optical scanner; and a second waveguide that provides optical communication between the first optical input and the receiver in the housing.

9. The distributed lidar system of claim 1, the first optical input further configured to direct the reflected frequency modulated waveform to the waveguide.

10. The distributed lidar system of claim 1, wherein a position from which the frequency modulated waveform leaves the first optical scanner and a position at which the reflected frequency modulated waveform encounters the first optical input are coaxial.

11. The distributed lidar system of claim 1, wherein the first optical scanner and the first optical input are fabricated on a common surface.

12. The distributed lidar system of claim 1, wherein the signal processing unit and the first optical head lack electrical communication therebetween.

13. The distributed lidar system of claim 1 being in a vehicle.

14. A vehicle, comprising:
a distributed lidar system, comprising:
a signal processing unit in a housing, the signal processing unit comprising:
a frequency modulated light source in the housing, the frequency modulated light source configured to provide a frequency modulated waveform; and
a receiver in the housing, the receiver configured to transform a reflected frequency modulated waveform into an electrical signal; and
a first optical head at a first location in the vehicle separate from the housing, the first optical head comprising:
a first optical scanner in optical communication with the frequency modulated light source, the first optical scanner configured to transmit the frequency modulated waveform into an environment; and
a first optical input in optical communication with the receiver, the first optical input configured to receive the reflected frequency modulated waveform from the environment;
a second optical head at a second location in the vehicle separate from the housing, the second optical head comprising:
a second optical scanner in optical communication with the frequency modulated light source; and
a second optical input in optical communication with the receiver;
at least one waveguide that provides optical communication between the signal processing unit and the first optical head; and
at least one differing waveguide that provides optical communication between the signal processing unit and the second optical head.

15. The vehicle of claim 14, further comprising:
an optical connector;
wherein a secondary vehicle is coupled to the vehicle, the secondary vehicle comprising a third optical head, the third optical head comprising:
a third optical scanner in optical communication with the frequency modulated light source via the optical connector of the vehicle; and
a third optical input in optical communication with the receiver via the optical connector of the vehicle.

16. The vehicle of claim 14, wherein at least one of the first optical head or the second optical head is behind a front grill of the vehicle.

17. The vehicle of claim 14, wherein at least one of the first optical head or the second optical head is in a door of the vehicle.

18. The vehicle of claim 14, wherein at least one of the first optical head or the second optical head is in a bumper assembly of the vehicle.

19. An autonomous vehicle, comprising:
a distributed lidar system, comprising:
a signal processing unit in a housing, the signal processing unit comprising:
a frequency modulated light source in the housing, the frequency modulated light source configured to provide a frequency modulated waveform;
a receiver in the housing, the receiver configured to transform a reflected frequency modulated waveform into an electronic signal;
a controller in the housing, the controller configured to derive information indicative of a distance to an object in an environment based on the electrical signal; and
a first optical head at a first location in the autonomous vehicle separate from the housing, the first optical head comprising:
a first optical scanner in optical communication with the frequency modulated light source, the first optical scanner configured to transmit the frequency modulated waveform into the environment; and
a first optical input in optical communication with the receiver, the first optical input configured to receive the reflected frequency modulated waveform from the environment;
a second optical head at a second location in the autonomous vehicle separate from the housing, the second optical head comprising:
a second optical scanner in optical communication with the frequency modulated light source; and
a second optical input in optical communication with the receiver;
at least one waveguide that provides optical communication between the signal processing unit and the first optical head; and
at least one differing waveguide that provides optical communication between the signal processing unit and the second optical head;
at least one processor in communication with the distributed lidar system, the at least one processor configured to enable the autonomous vehicle to autonomously operate, the at least one processor autonomously operates based at least in part on the information indicative of the distance to the object in the environment.

20. The vehicle of claim 14, the frequency modulated light source comprising a laser source optically coupled to a whispering gallery mode optical resonator.

* * * * *